United States Patent
Winter et al.

(10) Patent No.: US 6,548,628 B2
(45) Date of Patent: *Apr. 15, 2003

(54) PROCESS FOR PRODUCING A FILM OR LAYER

(75) Inventors: Andreas Winter, Glashütten (DE); Ernst Hofmann, Haibach (DE); Gerhard Wieners, Frankfurt (DE); Bernd Bachmann, Eppstein (DE)

(73) Assignee: Basell Polyolefine GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/769,462

(22) Filed: Dec. 20, 1996

(65) Prior Publication Data

US 2002/0182428 A1 Dec. 5, 2002

(51) Int. Cl.[7] .................................................. C08F 6/00
(52) U.S. Cl. .................... 528/481; 528/502 R; 528/503; 526/348.1; 264/171.1; 264/290.2; 264/331.17
(58) Field of Search ............... 526/348.1; 428/523; 528/481, 502 R, 503; 264/171.1, 290.2, 331.17

(56) References Cited

U.S. PATENT DOCUMENTS

| 4,681,924 | A | * | 7/1987 | Harris et al. | ......... | 526/348.2 X |
|---|---|---|---|---|---|---|
| 4,826,939 | A | * | 5/1989 | Stuart, Jr. | ............ | 526/348.5 X |
| 4,933,403 | A | * | 6/1990 | Kaminsky et al. | ...... | 526/351 X |
| 5,416,178 | A | * | 5/1995 | Winter et al. | ............ | 526/351 X |
| 5,491,011 | A | * | 2/1996 | Pezzoli et al. | .......... | 428/215 X |
| 5,629,398 | A | * | 5/1997 | Cheruvu et al. | ......... | 526/901 X |
| 5,795,946 | A | * | 8/1998 | Agarwal et al. | .......... | 526/348.1 |
| 5,830,968 | A | * | 11/1998 | Sadatoshi et al. | ........ | 526/348.1 |
| 6,063,483 | A | * | 5/2000 | Peiffer et al. | ......... | 526/348.1 X |
| 6,071,598 | A | * | 6/2000 | Peiffer et al. | ......... | 526/348.1 X |

FOREIGN PATENT DOCUMENTS

| EP | 0597502 | * | 5/1994 |
|---|---|---|---|
| WO | 9500333 | * | 1/1995 |
| WO | 9532242 | * | 11/1995 |

OTHER PUBLICATIONS

Plastics Materials and Processes, Seymour Schwartz (ed.), Van Nostrand Reinhold, N.Y., 1982, p. 506.*

* cited by examiner

Primary Examiner—Fred Teskin
(74) Attorney, Agent, or Firm—Connolly Bove Lodge & Hutz LLP

(57) ABSTRACT

The present invention relates to single- or multilayer films and one or more layers comprising at least one polyolefin molding composition containing at least one polyolefin derived from at least one olefin having at least 2 carbon atoms, of the formula $R^a$—CH=CH—$R^b$, in which $R^a$ and $R^b$ are identical or different and are a hydrogen atom or a straight-chain or branched $C_1$–$C_{15}$-alkyl radical, or $R^a$ and $R^b$, together with the atoms connecting them, form a ring or ring system, and the polyolefin has been prepared by means of metallocene catalysts. The present invention furthermore relates to a process for the production of films and layers in which a polyolefin molding composition having a particle size of from 20 μm to 5000 μm is used or prepared. The shaped polyolefin molding composition is melt-mixed with at least one additive and shaped. The melt-mixed and shaped material is melted at a temperature of from 150° C. to 300° C. The molten material is cooled and at the same time shaped to give a film or layer. Finally, the present invention also relates to the use of films and layers for the production of articles such as bags, composite materials and laminates.

17 Claims, 1 Drawing Sheet

PROCESS FOR PRODUCING A FILM OR LAYER

FIELD OF THE INVENTION

The present invention relates to films and layers of relatively high rigidity and strength, improved transparency and high gloss. The present invention furthermore relates to an economical and environmentally friendly process for the production of films and layers.

DESCRIPTION OF THE PRIOR ART

EP-A 484 816 and EP-A 484 817 disclose heat-sealable packaging films. The films described consist of a polypropylene base layer and at least one top layer of a propylene polymer, where the base layer is built up from an isotactic polypropylene and the top layer is built up from a copolymer of an α-olefin having 2 to 8 carbon atoms and syndiotactic propylene.

EP-A 589 213 discloses a heat-sealable multilayer polypropylene film, a process for the production thereof, and the use thereof. The multilayer film includes at least one base layer predominantly comprising polypropylene, and at least one top layer. The top layer is sealable and comprises an isotactic homopolymer of an olefin.

Joachim Nentwig, Kunststoff-Folien: Herstellung, Eigenschaften Anwendungen, Carl Hanser Verlag, Münich, Vienna, 1994, gives a comprehensive review of the prior art in plastic films.

The object of the present invention is to provide films and layers of relatively high rigidity and strength, improved transparency and high gloss and an economical and environmentally friendly process for the production of these films and layers.

SUMMARY OF THE INVENTION

The object of the present invention is achieved by single- or multilayer films and one or more layers comprising at least one polyolefin molding composition containing at least one polyolefin. The polyolefin is derived from at least one olefin having at least 2 carbon atoms, of the formula $R^a$—CH=CH—$R^b$. $R^a$ and $R^b$ are identical or different and are a hydrogen atom or a straight-chain or branched $C_1$–$C_{15}$-alkyl radical, or $R^a$ and $R^b$, together with the atoms connecting them, form a ring or ring system. The polyolefin is prepared by polymerization using at least one metallocene catalyst. The requisite property profile for polyolefins and therefore polyolefin molding compositions cannot be obtained using conventional known $MgCl_2/TiCl_4$/donor catalysts.

The polyolefin can contain up to 10% by weight, preferably up to 5% by weight, of ethylene or a second olefin as defined above as comonomer.

BRIEF DESCRIPTION OF THE DRAWING

The sole FIGURE (FIG. 1) of the Drawing is a flow chart illustrating a novel process carried out according to this invention in which films and layers are produced from propylene homopolymer or propylene copolymer and articles are produced from these materials.

DETAILED DESCRIPTION OF THE DRAWING

Figure 1:
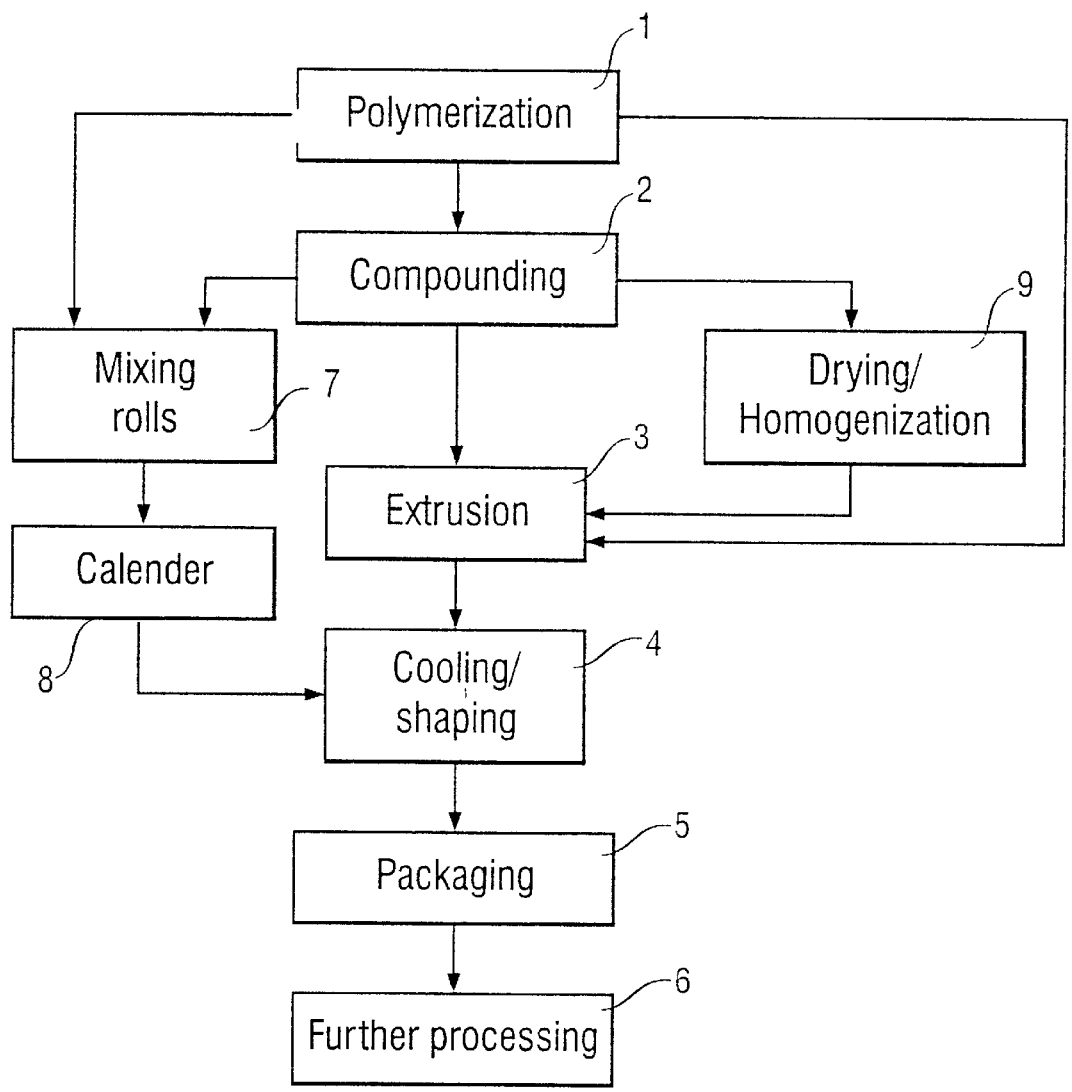

The polyolefin molding composition has an MFR (230/2.16) of from 0.3 to 260 g/10 min, or an MFR (230/5) of from 1 to 750 g/10 min. The MFR (230/2.16) is preferably from 1 to 150 g/10 min, particularly preferably 1.5 to 50 g/10 min. The MFR (230/5) is preferably from 3 to 450 g/10 min, particularly preferably from 4.5 to 150 g/min.

The molar mass is from 100,000 to 500,000 g/mol, preferably from 110,000 to 400,000 g/mol, particularly preferably from 120,000 to 340,000 g/mol. The polydispersity $M_w/M_n$ is from 1.5 to 10, preferably from 2 to 5, particularly preferably <3. The viscosity number is from 100 to 450 $cm^3$/g, preferably from 110 to 350 $cm^3$/g, particularly preferably from 120 to 300 $cm^3$/g.

The melting point is from 120 to 165° C., preferably from 130 to 162° C., particularly preferably from 140 to 160° C. The content of atactic polyolefin (ether-extractable content) is <2% by weight, preferably <1% by weight, particularly preferably <0.5% by weight, very particularly preferably <0.3% by weight. The residual catalyst content with respect to chlorine is <70 ppm, preferably <30 ppm, particularly preferably <20 ppm and with respect to transition metals is <50 ppm, preferably <20 ppm, particularly preferably <10 ppm.

The polyolefin can be a homopolymer or copolymer. If the polyolefin is a copolymer, the comonomer(s) is/are preferably incorporated in an isolated manner.

An ethylene/propylene copolymer for example thus has, for example, the following idealized structure:

. . . P-P-P-P-P-E-P-P-P-P-P-E . . .

The novel polyolefin molding composition essentially comprises isotactic, high-molecular-weight polyolefins, of which polypropylene may be mentioned in particular. The metallocene catalysts for the preparation of such polyolefins are known, and are preferably zirconocenes substituted at the two position on the indenyl ligands in a certain way, as described, for example, in EP-A 576 303, corresponds to U.S. Pat. No. 5,328,969, EP-A 549 900, which corresponds to U.S. Pat. No. 5,455,366, or EP-A 485,822, which corresponds to U.S. Pat. No. 5,243,001, or U.S. Pat. No. 5,278, 264 which are expressly incorporated herein by way of reference. However, it is also possible to use any other metallocene catalyst which is capable of producing a polyolefin and therefore a polyolefin molding composition with the abovementioned property profile.

By contrast, the customary $TiCl_4$-based catalysts cannot be used, since they are incapable of producing a uniform polymer as desired. Active centers of different types result in chains having very different structures. The formation of atactic polymer contents of >2% by weight cannot be avoided. Substantially isolated incorporation of comonomers cannot be achieved. Homopolymers having melting points of <160° C. cannot be prepared using $TiCl_4$ catalysts. The polymerization activities of such catalysts are significantly below those which can be achieved using metallocene catalysts.

Films having a low degree of orientation, high strength, rigidity and transparency and thicknesses of from 10 to 200 µm, polished films having comparable properties and thicknesses of from 150 to 1500 µm and sheets also having these properties and thicknesses of from 1000 to 20,000 µm are obtained. All these variants can exist either as single-layer or multilayer films. The novel polyolefin molding compositions can also be used to give blown films having thicknesses in the range from 2 to 200 µm which likewise have the abovementioned positive properties. The novel polyolefin molding compositions also enable the production of monoaxially oriented film webs having a width in the range from 0.1 to 3000 mm. The strength, rigidity and toughness are again particularly good here.

The transparencies of the abovementioned films are >85%, preferably >88%, particularly preferably >90%. The novel polyolefin molding compositions have significantly better mechanical material properties, such as strength, rigidity and toughness, than conventional polyolefin molding compositions.

The novel polyolefin molding compositions can also be coextruded and laminated as layers, applied to other materials in thicknesses of from 0.1 to 50 μm or designed as interlayers.

The invention provides a process for the production of films and layers in which a polyolefin molding composition having a particle size of from 20 μm to 5000 μm is used or prepared. The shaped polyolefin molding composition is melt-mixed with at least one additive and shaped. For the purposes of the present invention, this process step is referred to as compounding. The melt-mixed and shaped material is melted at a temperature of from 150° C. to 300° C. The molten material is cooled and at the same time shaped to give a film or layer.

The shaped material can be melted directly at a temperature of from 150° C. to 300° C. without prior melt-mixing with at least one additive in the compounding step.

The resultant films and layers can be packaged in the sense of the invention, where the films and layers are converted into a handleable form. To this end, the material is trimmed to size at the edges or wound up.

The films and layers, preferably after packaging, can be converted into articles in the sense of the invention. The articles are used in private households, in the healthcare sector and in commerce and industry.

The material which has been shaped or melt-mixed in the compounding step can be homogenized and rolled and employed in the shaping step. During homogenization, at least one additive can be added to the material.

Additives which can be used in the novel process are nucleating agents, stabilizers, antioxidants, UV absorbers, light stabilizers, metal deactivators, free-radical scavengers, lubricants, emulsifiers, pigments, inorganic and organic dyes, carbon black, flameproofing agents, antistatics, chemical blowing agents, minerals, cut glass fibers, synthetic fibers, such as carbon and aramid fibers, physical blowing agents, such as butane, propane and higher hydrocarbons, noble gases, nitrogen, CFCs, carbon dioxide or steam.

The material from the compounding step can be dried and homogenized and subsequently melted and then introduced into a mold.

The molten material can be applied to a substrate, such as metal, wood, polymeric material, textiles made from natural or synthetic fibers, or paper.

The films or layers can be monoaxially or biaxially oriented during further processing.

The invention proposes using a polyolefin molding composition containing at least one polyolefin for the production of films and layers.

The invention further proposes the use of films and layers for the production of articles such as bags, composite materials and laminates.

Preferred applications arise on the basis of this generally improved property profile of abovementioned illustrative variants. Owing to the reduced thickness, the novel films are particularly ecological, since material can be saved. Particularly rigid films made from a homogeneous material which can be produced in accordance with the prior art only by heterogeneous or multilayer material combinations enable environmentally appropriate recycling owing to the material purity. For example, trimmings from production and the packaging step can be recycled into the production process in an economically and ecologically advantageous manner. Articles made from these materials can be advantageously bonded or welded (high seam strength), printed (good stability of the surface activation, such as, for example, through corona treatment, fluorination or ozonation), have good barrier properties and have particularly low resilience, as required for use as twist-wrap films, for example for packaging confectionery. Narrow and highly longitudinally oriented film webs have a particularly low tendency to splinter.

The low content of catalyst residue constituents, in particular chlorine and transition-metal contents, enable the production of films, layers, sheets and packaged materials with a low tendency toward yellowing.

The low contents of low-molecular-weight or atactic constituents in the articles produced from the novel polyolefin molding compositions result in excellent organoleptic properties, in particular when used in food packaging.

These low contents also result in a reduction in formation of vapors and condensate during processing of the polyolefin molding composition. This means an improvement in occupational hygiene, an increase in the service lives of the molds owing to fewer cleaning periods, and an improvement in the life of the production media.

The invention is described in greater detail with reference to a drawing and examples.

DETAILED DESCRIPTION OF THE DRAWINGS

Turning now to the Drawing in process step (1), a polymerization is carried out as described in greater detail in Examples 1 to 14. The polymerization gives a powder having a particle size of from 20 μm to 5000 μm, preferably from 50 μm to 3500 μm, particularly preferably from 200 μm to 2000 μm.

In process step (2), this powder is compounded. The compounding step comprises melt-mixing with additives and granulation. The polymer to be processed can be mixed as a powder with one or more additives, such as nucleating agents, stabilizers, antioxidants, UV absorbers, light stabilizers, metal deactivators, free-radical scavengers, lubricants, emulsifiers, pigments, inorganic and organic dyes, carbon black, flameproofing agents, antistatics or chemical blowing agents.

The polymer to be processed can furthermore be mixed with one or more additives such as minerals, cut glass fibers or cut synthetic fibers, such as, for example, carbon or aramid fibers. The polymer can be premixed with additives and subsequently melted in one or more extruders. The polymer can also be melted directly in one or more extruders and subsequently treated with additives and melt-mixed. The melt is then cooled and shaped, in particular granulated.

The granulated material can, if necessary, be dried and homogenized in process step (9).

The ready-to-process material is melted in process step (3) in one or more extruders at a temperature of from 150° C. to 300° C., preferably from 170° C. to 270° C., particularly preferably from 1 80° C. to 230° C. The powder from process step (1) can also be employed directly in process step (3). In all these illustrative variants, further additives of those mentioned above can be introduced into the extruder in process step (3). In addition, physical blowing agents which are in the form of gaseous substances under the processing conditions can be introduced into the extruder. Examples of physical blowing agents are butane, propane and higher hydrocarbons, noble gases, nitrogen, CFCs, carbon dioxide and water. The melting in the novel process is preferably carried out at processing temperatures of from 0° C. to 50° C., preferably from 20° C. to 40° C., below the processing temperatures of the known materials. For the purposes of the invention, extruders are taken to mean all mixing apparatuses known from the prior art; cf. Handbuch der Kunststoff-Extrusionstechnik, editor F. Hensen, Carl Hanser Verlag, 1986. In general, the extruder or extruders feed to dies such as flat-film dies or annular dies.

In the case of multilayer films, the layers can be combined in the dies themselves or in upstream adapters. The dies can also be used to apply the molten material to a substrate as a coating. The substrate can be metal, wood, polymeric material, textiles made from natural or synthetic fibers, paper and other materials.

The molten material is cooled in process step (4) and at the same time shaped to give a sheet (panel), film, for example flat film (cast or polished film) or tubular film, for example blown film, or coating (extrusion coating or lamination). The cooling and shaping can be carried out on one or more consecutive chill rolls or in the nip of a polishing stack using air or water. During shaping, the chill rolls and polishing stacks can take off and transport the melts at the same rate or at up to fifteen times the rate at which they are extruded from the dies. The melt can also be taken off from a first chill roll at the same rate at which it is extruded from the die and subsequently be longitudinally oriented and transported stepwise in the cooled state by means of downstream high-speed rolls. The transportation and orientation can be carried out either after shaping or on cooled and packaged material. Composite materials and laminates can be monoaxially or biaxially oriented in a further process step (6) by means of suitable drawing devices after warming to below the melting point of the material of lowest melting point.

Materials extruded from annular dies at a take-off and transport rate which is higher than the extrusion rate can be monoaxially oriented or simultaneously biaxially oriented using the excess pressure, acting in the tube, in one or more expanding bubbles.

The cooled material is packaged in process step (6). To this end, the material, which is in the form of a flat film, tubular film, laminate or sheet, in the form of a single-layer or multilayer material or as a coating, is wound up or cut to size. Powder from process step (1) or polymer from process step (2) can be plasticated and homogenized directly on mixing rolls (7) preceding a calender (8) having 2 or more rolls. In both illustrative variants, the abovementioned additives can be fed to the mixing rolls (7). Cooling and shaping take place in the calender (8); cf. Kopsch, Kalandertechnik, Carl Hanser Verlag, Münich, 1978.

The cooled material is packaged in process step (6). Packaged material, preferably wound-up material, can be converted into articles in a plurality of further process steps (9), giving, for example, bags, composite materials and laminates. All articles can be printed, coated, laser-marked, inscribed and labeled.

EXAMPLES

The abbreviations explained in Table 1 below are used in the examples and comparative examples.

TABLE 1

| | |
|---|---|
| $M_w$ | Weight average molar mass (g/mol), determined by gel permeation chromatography |
| $M_w/M_n$ | Polydispersity, determined by gel permeation chromatography |
| II | Isotactic index ($^{13}$C-NMR spectroscopy) |
| $n_{iso}$ | Mean isotactic block lengths ($^{13}$C-NMR spec.) |
| $n_{PE}$ | Mean block length of polyethylene ($^{13}$C-NMR spec.) |
| VN | Viscosity number, measured at 135° C., 0.1% strength solution in decahydronaphthalene in a capillary viscometer |
| m.p. | Melting point in ° C. (determined by DSC, 20° C./min, heating/cooling rate) |
| Ethylene content | $^{13}$C-NMR spectroscopy |
| Ether-extractable components | Soxhlett extraction using boiling diethyl ether |
| MFR (230/2.16) | Melt flow index at 230° C., 2.16 kg load (ISO 1133) in g/10 min or dg/min |
| MFR (230/5) | Melt flow index at 230° C., 5 kg load (ISO 1133) in g/10 min or dg/min |

I. Polymerizations

The metallocene catalysts were prepared as described in EP-A 0 576 970, EP-A 0 545 303, EP-A 0 549 900, EP-A 0 485 822 or U.S. Pat. No. 5,278,264. However, the polymerizations are only intended to have an illustrative character. The novel polyolefin molding composition can, so long as it satisfies the definition of its properties, be prepared using any suitable metallocene catalyst system and any suitable polymerization process.

Example 1

A dry 150 dm$^3$ reactor was flushed with propylene and charged at 20° C. with 80 dm$^3$ of a benzine fraction having a boiling range of from 100 to 120° C. 50 l of liquid propylene were added, followed by 32 cm$^3$ of methylaluminoxane solution (solution in toluene, corresponding to 90 mmol of Al). The reactor contents were warmed to 50° C., and hydrogen was metered in until a hydrogen content of 1.8% by vol. had been reached in the gas space of the reactor. 10.0 mg of rac-dimethylsilylbis(2-methyl-4-phenyl-1-indenyl)zirconium dichloride were dissolved in 16 mol of a toluene solution of methylaluminoxane (corresponding to 25 mmol of Al) and introduced into the reactor. The mixture was polymerized for 15 hours at 60° C. while keeping the hydrogen content in the reactor constant at 1.8±0.3% by vol. The polymerization was terminated by means of CO$_2$ gas, and the polymer suspension was discharged to a downstream reactor. The suspension medium was separated from the polymer powder by steam distillation, and the aqueous polymer suspension was separated from the water via a pressure filter. The powder was dried for 24 hours at 80° C. and 100 mbar. The yield was 19.5 kg. The following data were measured on the powder:

MFR (230/2.16)=6 g/10 min; VN=234 cm$^3$/g; $M_w$=315,500 g/mol; $M_w/M_n$=2.3; melting point 157° C.; II=98.4%; $n_{iso}$=125; ether-extractable content 0.2% by weight.

Example 2

The procedure was as in Example 1, but the amount of hydrogen used was 2.4±0.4% by vol. The yield was 20.4 kg. The following data were measured on the powder:

MFR (230/2.16)=19 g/10 min; VN=159 cm$^3$/g; $M_w$=144,500 g/mol; $M_w/M_n$=2.1; melting point 158° C.; II=98.9%; $n_{iso}$=150; ether-extractable content=0.3% by weight.

Example 3

The procedure was as in Example 2, but the metallocene used was rac-dimethylsilylbis(2-methyl-4-naphthyl-1- indenyl)zirconium dichloride, and the amount of hydrogen was 3.0±0.5% by vol. The yield was 20.5 kg. The following data were measured on the powder:

MFR (230/2.16)=31 g/10 min; VN=132 cm$^3$/g; $M_w$=130,000 g/mol; $M_w/M_n$=2.0; melting point 160° C.; II=99.2%; $n_{iso}$=150; ether-extractable content 0.3% by weight.

Example 4

The procedure was as in Example 1, but the metallocene used was rac-dimethylsilylbis(2-methyl-4-phenanthryl-1-indenyl)zirconium dichloride, and the amount of hydrogen was 3.5±0.3% by vol. The yield was 18.5 kg. The following data were measured on the powder:

MFR (23012.16)=55 g/10 min; VN=124 cm$^3$/g; $M_w$=125,000 g/mol; $M_w/M_n$=2.7; melting point 159° C.; II=99.0%; $n_{iso}$=approx. 140; ether-extractable content 0.3% by weight.

Example 5

The procedure was as in Example 1, but the metallocene used was rac-dimethylsilylbis(2-ethyl-4,5-benzo-1-indenyl)zirconium dichloride, and the amount of hydrogen was 1.0±0.2% by vol. The yield was 17.5 kg. The following data were measured on the powder:

MFR (230/2.16)=3.5 g/10 min; VN=275 cm$^3$/g; $M_w$=331,500 g/mol; $M_w/M_n$=2.2; melting point 146° C.; II=95.2%; $n_{iso}$=48; ether-extractable atactic content 0.2% by weight.

Example 6

The procedure was as in Example 1, but the metallocene used was rac-dimethylsilylbis(2-methyl-1-indenyl)zirconium dichloride in an amount of 15 mg, and the amount of hydrogen was 0.7±0.2% by vol. The yield was 20.4 kg. The following data were measured on the powder:

MFR (230/2.16)=23 g/10 min; VN=161 cm$^3$/g; $M_w$=139,500 g/mol; $M_w/M_n$=2.1; melting point 150° C.; II=97.1%; $n_{iso}$=62; ether-extractable atactic content 0.3% by weight.

Example 7

The procedure was as in Example 6, but the amount of hydrogen was 1.2±0.2% by vol. The yield was 21.1 kg. The following data were measured on the powder:

MFR (230/2.16)=34 g/10 min; VN=136 cm$^3$/g; $M_w$=132,500 g/mol; $M_w/M_n$=2.7; melting point 148° C.; II=96.5%; $n_{iso}$=56; ether-extractable atactic content 0.3% by weight.

Example 8 rac-Dimethylsilylbis(2-methyl-4-naphthyl-1-indenyl)zirconium dichloride was supported on "F-MAO on SiO$_2$" analogously to EP-A 0 576 970, Example 28. Analogously to Example 1, the polymerization was carried out using 30 g of the supported catalyst suspended in 250 ml of a benzine fraction with a boiling range of from 100 to 120° C. with the aromatics removed. The amount of hydrogen used was 4.0±0.3% by vol. and the polymerization temperature was 75° C. The yield was 20.7 kg. The following data were measured on the powder:

MFR (23012.16)=49 g/10 min; VN=141 cm$^3$/g; $M_w$=136,500 g/mol; $M_w/M_n$=2.8; melting point 151° C.; II=97.3%; $n_{iso}$=70; ether-extractable atactic content 0.25% by weight.

Example 9

Example 1 was repeated, but the amount of hydrogen was adjusted to 0.2±0.1% by vol. and 500 g of ethylene were metered in over the 15-hour polymerization time. The yield was 20.5 kg. The following data were measured on the powder:

Ethylene content 1.9% by weight, $n_{PE}$<1.3 (i.e. the majority of the ethylene units were incorporated in an isolated manner); MFR (230/2.16)=5.4 g/10 min; VN=239 cm$^3$/g; $M_w$=223,500 g/mol; $M_w/M_n$=2.5; melting point 133° C.; ether-extractable atactic content 0.3% by weight.

Example 10

Example 9 was repeated using 350 g of ethylene and 0.6±0.2% by vol. of hydrogen. The yield was 18.7 kg. The following data were measured on the powder:

Ethylene content 1.3% by weight, $n_{PE}$=1.2; MFR (23012.16)=9.5 g/10 min; VN=186 cm$^3$/g; $M_w$=168,000 g/mol; $M_w/M_n$=2.6; melting point 137° C.; ether-extractable atactic content 0.4% by weight.

Example 11

Example 10 was repeated using 500 g of 1-hexene. The yield was 17.3 kg. The following data were measured on the powder:

Hexene content 1.2% by weight; $n_{hexene}$=1.0; MFR (230/2.16)=18 g/10 min; VN=159 cm$^3$/g; $M_w$=148,500 g/mol; $M_w/M_n$=2.3; melting point 141° C.; ether-extractable atactic content 0.3% by weight.

Example 12

Example 10 was repeated using 1.2±0.3% by vol. of hydrogen. The yield was 19.3 kg. The following data were measured on the powder:

Ethylene content 1.4% by weight; $n_{PE}$=1.2; MFR (230/2.16)=29 g/10 min; VN=142 cm$^3$/g; $M_w$=135.000 g/mol; $M_w/M_n$=2.5; melting point 136° C.; ether-extractable atactic content 0.5% by weight.

Example 13

Example 5 was repeated using the metallocene rac-dimethylsilylbis(2-methyl-4,6-diisopropyl-1-indenyl)zirconium dichloride and 0.7±0.1% by vol. of hydrogen. The yield was 18.4 kg. The following data were measured on the powder:

MFR (230/2.16)=10.5 g/10 min; VN=205 cm$^3$/g; $M_w$=194,500 g/mol; $M_w/M_n$=2.1; melting point 147° C.; II=96.7%; $n_{iso}$=63; ether-extractable atactic content 0.3% by weight.

Example 14

Example 1 was repeated using 2.1±0.2% by vol. of hydrogen. The yield was 22.7 kg. The following data were measured on the powder:

MFR (230/2.16)=9.5 g/10 min; VN=215 cm$^3$/g; $M_w$=201,500 g/mol; $M_w/M_n$=2.3; melting point 158° C.; II=98.7%; $n_{iso}$=135; ether-extractable atactic content 0.2% by weight.

Table 2 below shows a comparison of Examples 1 to 14 with respect to the polymerization and the data measured on the polymers prepared.

TABLE 2

|  | B1 | B2 | B3 | B4 | B5 | B6 | B7 |
|---|---|---|---|---|---|---|---|
| Propylene [l] | 50 | 50 | 50 | 50 | 50 | 50 | 50 |
| $H_2$ [% by vol.] | 1.8 ± .3 | 2.4 ± 4 | 3.0 ± 5 | 3.5 ± 3 | 1.0 ± 2 | 0.7 ± 2 | 1.2 ± 2 |
| Time [h][1] | 15 | 15 | 15 | 15 | 15 | 15 | 15 |
| T [° C.][2] | 60 | 60 | 60 | 60 | 60 | 60 | 60 |
| Yield [kg] | 19.5 | 20.4 | 18.4 | 18.5 | 17.5 | 20.4 | 21.1 |
| $M_w$ [g/mol] | 315,500 | 144,500 | 130,000 | 125,000 | 331,500 | 139,500 | 132,500 |
| $M_w/M_n$ | 2.3 | 2.1 | 2.0 | 2.7 | 2.2 | 2.1 | 2.7 |
| II [%] | 98.4 | 98.9 | 99.2 | 99.0 | 95.2 | 97.1 | 96.5 |
| $n_{iso}$ | 125 | 150 | 150 | 140 | 48 | 62 | 56 |
| $n_{PE}$ | — | — | — | — | — | — | — |
| VN [cm³/g] | 234 | 159 | 132 | 124 | 275 | 161 | 136 |
| m.p. [° C.] | 157 | 158 | 160 | 159 | 146 | 150 | 148 |
| extr. content[3] | 0.2 | 0.3 | 0.3 | 0.3 | 0.2 | 0.3 | 0.3 |
| MFR [dg/min] | 6 | 19 | 31 | 55 | 3.5 | 23 | 34 |

[1] Polymerization time
[2] Polymerization temperature
[3] Extractable content in % by weight

TABLE 2

|  | B8 | B9 | B10 | B11 | B12 | B13 | B14 |
|---|---|---|---|---|---|---|---|
| Propylene [l] | 50 | 50 | 50 | 50 | 50 | 50 | 50 |
| Ethylene [g] |  | 500 | 350 |  | 350 |  |  |
| 1-Hexene [g] |  |  |  | 500 |  |  |  |
| $H_2$ [% by vol.] | 4.0 ± 3 | 0.2 ± 1 | 0.6 ± 2 | 3.5 ± 3 | 1.2 ± 3 | 0.7 ± 1 | 2.1 ± 2 |
| Time [h][1] | 15 | 15 | 15 | 15 | 15 | 15 | 15 |
| T [° C.][2] | 75 | 60 | 60 | 60 | 60 | 60 | 60 |
| Yield [kg] | 20.7 | 20.5 | 18.7 | 17.3 | 19.3 | 18.4 | 22.7 |
| $M_w$ [g/mol] | 136,500 | 223,500 | 168,000 | 148,500 | 135,000 | 194,500 | 201,500 |
| $M_w/M_n$ | 2.8 | 2.5 | 2.6 | 2.3 | 2.5 | 2.1 | 2.3 |
| II [%] | 97.3 | — | — | — | — | 96.7 | 98.7 |
| $n_{iso}$ | 70 | — | — | — | — | 63 | 135 |
| $n_{PE}$ | — | 1.3 | 1.2 | — | 1.2 | — | — |
| VN [cm³/g] | 141 | 239 | 186 | 159 | 142 | 205 | 215 |
| m.p. [° C.] | 151 | 133 | 137 | 141 | 136 | 147 | 158 |
| extr. content[3] | 0.25 | 0.3 | 0.4 | 0.3 | 0.5 | 0.3 | 0.2 |
| MFR [dg/min] | 49 | 5.4 | 9.5 | 18 | 29 | 10.5 | 9.5 |

II. Processing

Example 15

100 parts of polymer powder from Example 6 were mixed with 0.05 part of Irganox 1010, 0.05 part of calcium stearate and 0.05 part of Hostanox PAR 24, the mixture was compounded in an IDE 60 mm single-screw extruder, and the compound was subsequently granulated in a granulator. The granules were extruded in a single-screw flat-film unit (diameter 70 mm) fitted with flat-film die at a material temperature of 200° C. to give a flat film having a width of 700 mm and a thickness of 85 μm, and the extruded film was cooled on a chill roll at 28° C., trimmed at the edges and then wound up.

Comparative Example 151

A comparable flat film was produced under the conditions mentioned in Example 15 using the non-novel material Hostalen PPU 1780 F1.

The films from Example 15 and Comparative Example 151 were analyzed by the test methods shown in Table 3 and compared. A tensile test was carried out on the films in accordance with DIN 53455.

TABLE 3

| Test method | Example 15 | CE 151 |
|---|---|---|
| Tear strength* [MPa] | 31.4 | 26 |
| Elongation at break* [%] | 720 | 700 |
| Modulus of elasticity in tension* [MPa] | 1350 | 1120 |
| MFR (230/2.16) on films [g/10 min] | 26.6 | 24.0 |
| Puncture resistance [mN/layer of film] | 1140 | 1010 |

*The table shows the longitudinal measurement values.

Example 16

The granules in Example 16 were produced as in Example 15. The polymer powder used was the product from Example 7. The granules were used to produce a flat film having a width of 1250 mm and a thickness of 100 μm at a material temperature of 240° C. The film was cooled on a smooth chill roll at 18° C., trimmed at the edges and then wound up, giving an A-B-A coextruded film. The layers A of the film were extruded by means of a satellite extruder having a diameter of 70 mm. Layer B was extruded by means of a main extruder having a diameter of 105 mm. Layers A, B and A were combined before the flat-film die in an adapter having a layer thickness ratio of 1:8:1. Layer A was produced from polymer powder as in Example 7 by the process of Example 15. Layer B was produced from Hostalen PPT 1770 F2 by the process of Example 15.

Comparative Example 161

Comparative Example 161 was carried out as for Example 16, but layer A was produced from Hostalen PPU 1780 F1 by the process of Example 15.

Comparative Example 162

Comparative Example 162 was carried out as for Example 16, but layer A was produced from Hostalen PPT 1770 F2 by the process of Example 15.

Comparative Example 163

Comparative Example 163 was carried out as for Example 16, but a single-layer film was produced from Hostalen PPT 1770 F2 by the process of Example 15.

The films from Example 16 and Comparative Examples 161, 162 and 163 were analyzed by the test methods shown in Table 4 and compared. A tensile test was carried out on the films in accordance with DIN 53455.

TABLE 4

| Test method | Example 16 | CE 161 | CE 162 | CE 163 |
| --- | --- | --- | --- | --- |
| Tear strength* [Mpa] | 32 | 29 | 28 | 28 |
| Elongation at break* [%] | 620 | 570 | 530 | 600 |
| Modulus of elasticity in tension* [Mpa] | 785 | 720 | — | — |
| Total transmission [%]# | 94 | 90 | — | 80 |
| Puncture resistance [mN/layer of film] | 2370 | 2080 | 1850 | 1950 |

*The table shows the longitudinal measurement values.
The measurement was carried out in a comparable way to ASTM D 1003.

Example 17

100 parts of polymer powder from Example 10 were mixed with 0.05 part of Irganox 1010, 0.17 part of silica, 0.17 part of erucamide, 0.1 part of Hostanox PAR 24 and 0.03 part of calcium carbonate, the mixture was compounded in an IDE 60 mm single-screw extruder, and the compound was subsequently granulated in a granulator. The granules were converted into a flat film having a width of 180 mm and a thickness of 80 μm in a coextrusion unit (diameter 30 mm) operated as a monolayer extrusion unit at a material temperature of 230° C., extruded using a flat-film die, cooled on a smooth chill roll at 28° C., trimmed at the edges and then wound up.

Comparative Example 171

Comparative Example 171 was carried out as for Example 17, but 100 parts of a non-novel polymer powder having a C2 content of 4% were mixed with the other constituents (the polymer was prepared using a Ti catalyst and contained 3.7% by weight of atactic polypropylene).

The films from Example 17 and Comparative Example 171 were analyzed by the test methods shown in Table 5 and compared. A tensile test on the films was carried out in accordance with DIN 53455, a gloss measurement at an angle of 200 in accordance with DIN 67530 and a measurement of transparency and haze in accordance with ASTM D 1003.

TABLE 5

| Test method | Example 17 | CE 171 |
| --- | --- | --- |
| Yield stress* [MPa] | 17.6 | 15.8 |
| Tear strength* [Mpa] | 29 | 27 |
| Elongation at break* [%] | 630 | 590 |
| Modulus of elasticity in tension* [Mpa] | 540 | 500 |
| Gloss, 20° | 172 | 140 |
| Transparency [%] | 93 | 90 |
| Haze [%] | 7 | 10 |
| MFR (230/2.16 on films [g/10 min] | 11 | 9 |
| Puncture resistance [mN/layer of film] | 1240 | 1100 |

*The table shows the longitudinal measurement values, comparable values being measured transversely.

Example 18

In each case, 100 parts of polymer powder from Example 10 or 1 were mixed with 0.05 part of Irganox 1010, 0.17 part of silica, 0.17 part of erucamide, 0.1 part of Hostanox PAR 24 and 0.03 part of calcium carbonate, the mixture was compounded in an IDE 60 mm single-screw extruder, and the compound was subsequently granulated in a granulator. The granules were converted into an A-B coextruded film having a width of 180 mm and a thickness of 80 μm in a coextrusion unit (diameter 30 mm) at a material temperature of 230° C. Layer A of the film was extruded by means of a satellite extruder having a diameter of 25 mm. Layer B was extruded by means of a main extruder having a diameter of 30 mm. Layers A and B were combined in a coextrusion die in a layer thickness ratio of 1:9. Layer A was produced from polymer powder from Example 10 by the process of Example 17.

Layer B was produced from polymer powder from Example 1 by the process of Example 17.

Comparative Example 181

Comparative Example 181 was carried out as for Example 18, but layers A and B. were produced by mixing a polymer powder of a homopolypropylene with the remaining constituents.

The films from Example 18 and Comparative Example 181 were analyzed by the test methods shown in Table 6 and compared. A tensile test was carried out on the films in accordance with DIN 53455 and a gloss measurement at an angle of 20°.

TABLE 6

| Test method | Example 18 | CE 181 |
| --- | --- | --- |
| Yield stress* [MPa] | 18.1 | 18.1 |
| Tear strength* [Mpa] | 30.6 | 27.1 |
| Elongation at break* [%] | 630 | 507 |
| Modulus of elasticity in tension* [Mpa] | 690 | 600 |
| Gloss, 20° | 168 | 117 |

*The table shows the longitudinal measurement values.

Example 19

Example 19 was carried out as for Example 18, but the material used for layer B was Hostalen PPT 1770 F2.

The films from Example 19 and Comparative Example 181 were analyzed by the test methods shown in Table 7 and compared. A tensile test was carried out on the films in accordance with DIN 53455 and a gloss measurement at an angle of 20°.

TABLE 7

| Test method | Example 19 | CE 181 |
| --- | --- | --- |
| Yield stress* [Mpa] | 18.9 | 30.6 |
| Tear strength* [Mpa] | 28.1 | 27.1 |
| Elongation at break* [%] | 630 | 507 |
| Modulus of elasticity in tension* [Mpa] | 620 | 600 |
| Gloss, 20° | 148 | 117 |

*The table shows the longitudinal measurement values.

Example 20

Example 17 is repeated, but the polymer powder used was a material as in Example 14. The tests carried out on the film analogously to Example 17 are shown in Table 8.

Examples 21–24

Example 17 was repeated, but the polymer powders used were the materials from Example 9 (Example 21), Example 13 (Example 22), Example 1 1 (Example 23) and Example 12 (Example 24).

The tests on the films analogous to Example 17 are shown in Table 8.

TABLE 8

| Test method | Ex. 20 | Ex. 21 | Ex. 22 | Ex. 23 | Ex. 24 | Ex. 25 |
| --- | --- | --- | --- | --- | --- | --- |
| Yield stress [MPa] | 19.9 | 15.9 | 18.0 | 17.0 | 16.9 | 18.5 |
| Tear strength [Mpa] | 37.5 | 29.0 | 31.9 | 30.1 | 29.5 | 33 |
| Elongation at break | 600 | 700 | 600 | 730 | 740 | 820 |
| Modulus of elasticity in tension | 670 | 510 | 630 | 540 | 535 | 600 |
| Gloss, 20° | 158 | 180 | 154 | 170 | 178 | 150 |
| Transparency [%] | 92 | 95 | 93 | 94 | 94 | 93 |
| Haze [%] | 8 | 5 | 7 | 6 | 6 | 7 |
| MFR (230/2.16) on films [g/10 min] | 10.3 | 5.6 | 10.0 | 19 | 31 | 50 |

Example 25

Example 17 was repeated, but the polymer powder used was a material from Example 8. The tests on the film analogous to Example 17 are shown in Table 8.

Examples 26–30

Example 15 was repeated, but the polymer powder used was the material from Example 1 (Example 26), Example 2 (Example 27), Example 3 (Example 28), Example 4 (Example 29) or Example 5 (Example 30). The tests on the films analogous to Example 17 are shown in Table 9.

TABLE 9

| Test method | Ex. 26 | Ex. 27 | Ex. 28 | Ex. 29 | Ex. 30 |
| --- | --- | --- | --- | --- | --- |
| Tear strength [Mpa] | 36.7 | 38.1 | 40.3 | 43.5 | 29.8 |
| Elongation at break [%] | 710 | 720 | 800 | 930 | 715 |
| Modulus of elasticity in tension [MPa] | 1480 | 1500 | 1560 | 1600 | 1300 |
| MFR (230/2.16) on films [g/10 min] | 6.3 | 20 | 20 | 57 | 3.0 |

Examples 31 and 32

100 parts of polymer powder from Example 1 (Example 31) were mixed with 0.05 part of Irganox 1010, 0.1 part of Hostanox PAR24, 0.03 part of calcium carbonate and 0.05 part of sodium benzoate, the mixture was compounded in an IDE 60 mm single-screw extruder, and the compound was subsequently granulated in a granulator. The granules were extruded in a single-screw flat-film unit (diameter 60 mm) at a material temperature of 230° C. to give a flat film having a width of 300 mm and a thickness of 1200 μm. The film was cooled on a roll in a water bath. In a further step, the cooled film was stretched first longitudinally and then transversely (longitudinal stretching factor 6 and transverse stretching factor 8). The mean stretching temperature was 153° C. The same procedure was carried out for a polymer corresponding to Example 5 (Example 32) and with the comparison material Hostalen PPR 1060 F3 (Comparative Example 311). The films were analyzed by the test methods shown in Table 10. A tensile test was carried out on the films in accordance with DIN 53455.

TABLE 10

| Test method | Example 31 | Example 32 | Comparative Example 311 |
| --- | --- | --- | --- |
| MFR (230/2.16) on films [g/10 min] | 5.8 | 3.4 | 3.5 |
| Modulus of elasticity in tension longitudinal [Mpa] | 3200 | 2930 | 2400 |
| Modulus of elasticity in tension transverse [MPa] | 6070 | 5130 | 3860 |

Example 33 and Comparative Example 331

The procedure was as in Example 15, but the granules were mixed with 1.5% by weight of Hydrocerol HP40P (blowing agent comprising a polymer blend and citric acid having a decomposition temperature of 160° C.) and extruded in a single-screw flat-film unit (diameter 70 mm) fitted with a flat-film die at a material temperature of 190° C. to give a foam film, formed by means of this foam former, having a width of 700 mm and a thickness of 130 μm, and the film was cooled on a chill roll at 40° C., trimmed at the edges and then wound up.

A comparable foam film was produced in the same way using a non-novel material (Hostalen PPU1780F1). Table 11 shows the results of tests on these films.

TABLE 11

| Test method | Example 33 | Comparative Example 331 |
|---|---|---|
| Film thickness [μm] | 130 | 135 |
| Density [g/cm³] of the foam film | 0.68 | 0.68 |
| Yield stress [MPa] | | |
| longitudinal | 13.3 | 10.5 |
| transverse | 7.8 | 7.0 |
| Elongation at yield stress [MPa] | | |
| longitudinal | 5 | 5 |
| transverse | 2 | 2 |
| Tear strength [Mpa] | | |
| longitudinal | 14 | 10.3 |
| transverse | 8 | 7.3 |
| Elongation at break [%] | | |
| longitudinal | 445 | 440 |
| transverse | 21 | 30 |
| Modulus of elasticity in tension [MPa] | | |
| longitudinal | 460 | 410 |
| transverse | 250 | 200 |

What is claimed is:

1. A process for producing a film or a layer comprising the steps of:

a) providing at least one polyolefin molding composition with a particle size of from 20 to 5,000 μm, b) optionally, compounding the at least one polyolefin composition with at least one additive to form a resultant mixture, c) melting the resultant mixture at a temperature of from 150 to 300° C. to form a molten material, and d) cooling and shaping the molten material to form the film or layer, wherein
the polyolefin molding composition comprises at least one polyolefin derived from at least one olefin having at least 2 carbon atoms, of the formula $R^a$—CH=CH—$R^b$, in which $R^a$ and $R^b$ are identical or different and are a hydrogen atom or a straight-chain or branched $C_1$–$C_{15}$ alkyl radical, or $R^a$ and $R^b$ together with the atoms connecting them, form ring system, and the at least one polyolefin is essentially isotactic and has been prepared by means of a metallocene catalyst and wherein the at least one polyolefin molding composition has a molar mass of from 120,000 to 500,000 g/mol.

2. The process as claimed in claim 1, wherein the at least one polyolefin molding composition has an MFR (230/2.16) of from 0.3 to 260 g/10 min.

3. The process as claimed in claim 1, wherein the at least one polyolefin molding composition has a polydispersity Mw/Mn of from 1.5 to 10.

4. The process as claimed in claim 1, wherein the at least one polyolefin molding composition has a viscosity number of from 100 to 450 cm³/g.

5. The process as claimed in claim 1, wherein the metallocene catalyst contains a transition metal and, optionally, chlorine, and the at least one polyolefin has an atactic polymer content of <2% by weight, a residual catalyst content with respect to chlorine of <70 ppm, and a residual content with respect to the transition metal of <50 ppm.

6. The process as claimed in claim 1, wherein the compounding step comprises melt-mixing and shaping the at least one polyolefin composition with the at least one additive.

7. The process as claimed in claim 1, further comprising the step of packaging the film or layer.

8. The process as claimed in claim 1, further comprising the step of converting the film or layer into an article.

9. The process as claimed in claim 1, further comprising the step of homogenizing the at least one polyolefin molding composition or the resultant mixture.

10. The process as claimed in claim 1, wherein the polyolefin molding composition comprises at least one polyolefin containing up to 10% by weight of ethylene or a second olefin as comonomer.

11. The process as claimed in claim 1, wherein at least one material in step (c) is applied to a substrate.

12. The process as claimed in claim 11, wherein the substrate is metal, wood, polymeric material, textiles made from natural or synthetic fibers or paper.

13. The process as claimed in claim 1, wherein the film produced is monoxially or biaxially oriented.

14. The process as claimed in claim 1, wherein the at least one polyolefin molding composition has a molar mass of from 120,000 to 400,000 g/mol.

15. The process as claimed in claim 1, wherein the at least one polyolefin molding composition has a molar mass of from 120,000 to 340,000 g/mol.

16. The process as claimed in claim 1, wherein the at least one polyolefin molding composition has a polydispersity $M_w/M_n$ of from 2 to 5.

17. The process as claimed in claim 1, wherein the at least one polyolefin molding composition has a polydispersity $M_w/M_n$ of <3 and a viscosity number from 120 to 300 cm³/g.

* * * * *